I. F. ARNOW.
SHOVEL.
APPLICATION FILED SEPT. 1, 1914.
1,136,754. Patented Apr. 20, 1915.
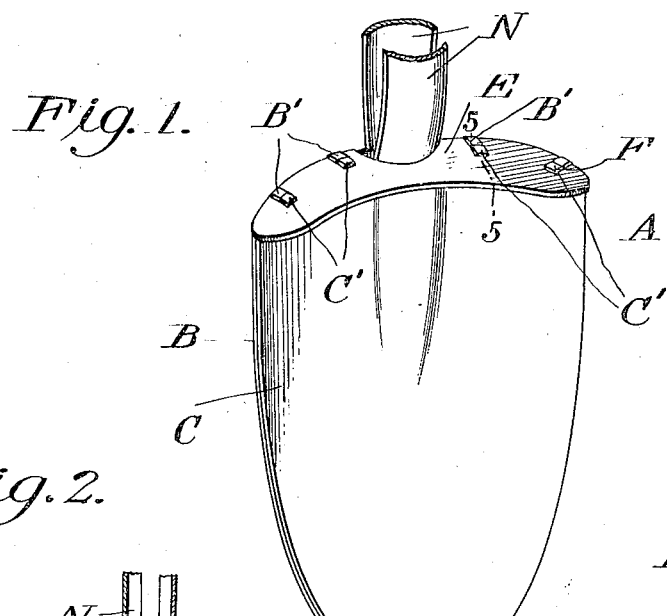
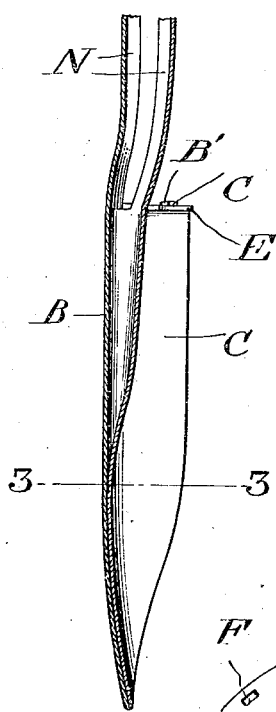
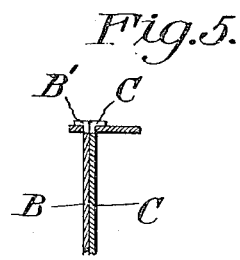
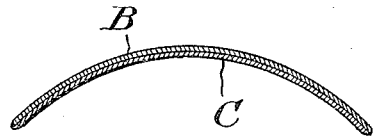
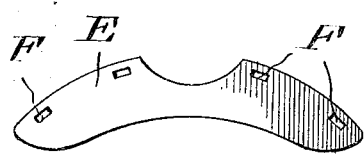
Witnesses
Fenton S. Belt
J. W. Sherwood
Inventor
I. F. Arnow
by Franklin H. Hough
Attorney

UNITED STATES PATENT OFFICE.

ISAAC FLOOD ARNOW, OF ST. MARYS, GEORGIA.

SHOVEL.

1,136,754.   Specification of Letters Patent.   Patented Apr. 20, 1915.

Application filed September 1, 1914.  Serial No. 859,663.

*To all whom it may concern:*

Be it known that I, ISAAC F. ARNOW, a citizen of the United States, residing at St. Marys, in the county of Camden and State of Georgia, have invented certain new and useful Improvements in Shovels; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in shovels, spades, etc., and the object in view is to produce a device of this nature provided with a flange or projection upon the heel of the shovel forming a foot-rest against which the foot of an operator may rest when pushing the spade in the ground.

My invention comprises a simple and efficient device of this nature having various details of construction and combinations and arrangements of parts which will be hereinafter fully described and then specifically defined in the appended claim.

My invention is illustrated in the accompanying drawings, in which:

Figure 1 is a perspective view of a shovel made in accordance with my invention. Fig. 2 is a sectional view longitudinally through the shovel. Fig. 3 is a sectional view on line 3—3 of Fig. 2. Fig. 4 is a detail in elevation of a heel plate and Fig. 5 is a sectional view on line 5—5 of Fig. 1.

Reference now being had to the details of the drawings by letter, A designates a shovel which may be of any size or shape and made up of two sheets of metal, designated by letters B and C. When two sheets are used, which will be welded or otherwise secured together, the sheet B will be provided with lugs B' and the sheet C with lugs C'. E designates a plate or bar having holes F formed therein for the reception of said lugs which, after having been passed through the holes, are bradded down, thus securely holding the plate or bar E at right angles to the heel of the shovel and forming a flat foot rest against which the operator may press with his foot when pushing the shovel into the ground.

By the provision of a shovel made in accordance with my invention, it will be noted that a simple and efficient device is afforded whereby the foot of an operator may exert considerable pressure against the shovel to force the same into the ground or other material without the heel of the shovel cutting into the shoe of the operator.

What I claim to be new is:

A shovel blade comprising united sheets of metal, each provided with an integral projection coöperating to form a socket for a handle, a foot rest extending the width of the heel of the blade and in contact therewith, one edge of the foot rest being provided with a concaved recess for the reception of one of said projections and apertured adjacent to one edge, said sheets having integral lugs upon the heel thereof extending through the apertures in said foot rest and bent at angles in opposite directions against the upper surface of the foot rest.

In testimony whereof I hereunto affix my signature in presence of two witnesses.

ISAAC FLOOD ARNOW.

Witnesses:
 CHAS. S. ARNOW,
 B. B. DAVIS.

Copies of this patent may be obtained for five cents each, by addressing the "Commissioner of Patents, Washington, D. C."